(12) United States Patent
Cerniway et al.

(10) Patent No.: US 9,726,247 B2
(45) Date of Patent: Aug. 8, 2017

(54) APPARATUS AND METHOD FOR CABLE DYNAMICS SUPPRESSION VIA NON-LINEAR FLEXURES

(71) Applicant: Sercel, Inc., Houston, TX (US)

(72) Inventors: Matthew Cerniway, Katy, TX (US); Phillip West, Katy, TX (US); Michael Maples, Houston, TX (US)

(73) Assignee: SERCEL, INC., Houston, TX (US)

( * ) Notice: Subject to any disclaimer, the term of this patent is extended or adjusted under 35 U.S.C. 154(b) by 364 days.

(21) Appl. No.: 14/521,608

(22) Filed: Oct. 23, 2014

(65) Prior Publication Data

US 2016/0118161 A1    Apr. 28, 2016

(51) Int. Cl.
| | |
|---|---|
| *H01B 7/24* | (2006.01) |
| *F16F 3/087* | (2006.01) |
| *F16F 15/08* | (2006.01) |
| *F16F 15/02* | (2006.01) |
| *F16F 1/36* | (2006.01) |
| *G01V 1/20* | (2006.01) |
| *G01V 1/38* | (2006.01) |

(52) U.S. Cl.
CPC .............. *F16F 3/0873* (2013.01); *F16F 1/36* (2013.01); *F16F 15/022* (2013.01); *F16F 15/08* (2013.01); *G01V 1/201* (2013.01); *G01V 1/38* (2013.01); *F16F 2226/04* (2013.01); *F16F 2230/0023* (2013.01); *G01V 2001/205* (2013.01)

(58) Field of Classification Search
CPC ........ H01B 7/24; H01B 7/14; H01B 13/0036; F16F 15/08; F16F 15/022; F16F 1/36; F16F 3/0873; F16F 2226/04; F16F 2230/0023

See application file for complete search history.

(56) References Cited

U.S. PATENT DOCUMENTS

| | | | | |
|---|---|---|---|---|
| 4,779,852 A | * | 10/1988 | Wassell ..................... | F16F 1/32 166/319 |
| 5,558,191 A | * | 9/1996 | Lai ........................ | F16F 1/387 188/379 |
| 2011/0041644 A1 | * | 2/2011 | Choi ....................... | F16C 1/262 74/502.5 |
| 2012/0049422 A1 | * | 3/2012 | Gnateski ................. | F16F 1/028 267/140.13 |

* cited by examiner

*Primary Examiner* — Vishal Sahni
(74) *Attorney, Agent, or Firm* — Patent Portfolio Builders PLLC (57) ABSTRACT

Method and apparatus for suppressing cable dynamics in a device towed in water. The apparatus includes at least one section for suppression of motion, wherein the at least one section includes an axial motion suppression section; and the axial motion suppression section comprising equipment for the attenuation of axial vibrations in an electro-mechanical cable. The equipment is configured to produce a digressive stiffness curve.

20 Claims, 6 Drawing Sheets

APPARATUS AND METHOD FOR CABLE DYNAMICS SUPPRESSION VIA NON-LINEAR FLEXURES

BACKGROUND

Technical Field

Embodiments of the subject matter disclosed herein generally relate to an apparatus and method for cable dynamics suppression via non-linear multi-axis flexures.

Discussion of the Background

An electro-mechanical cable may be a cable, such as, for example, a marine-seismic cable, including sensor components, data-transmission cables, power-transmission cables and strength enhancing and buoyancy enhancing components arranged in a single cable. A marine-seismic cable may be an electro-mechanical cable used for gathering data on the nature and composition of the earth below a body of water using seismic imaging techniques. The marine-seismic cable, or seismic streamer, may be designed to reduce hydrodynamic induced flow noise. For example, the marine seismic cable may be cylindrical.

Figure 1:
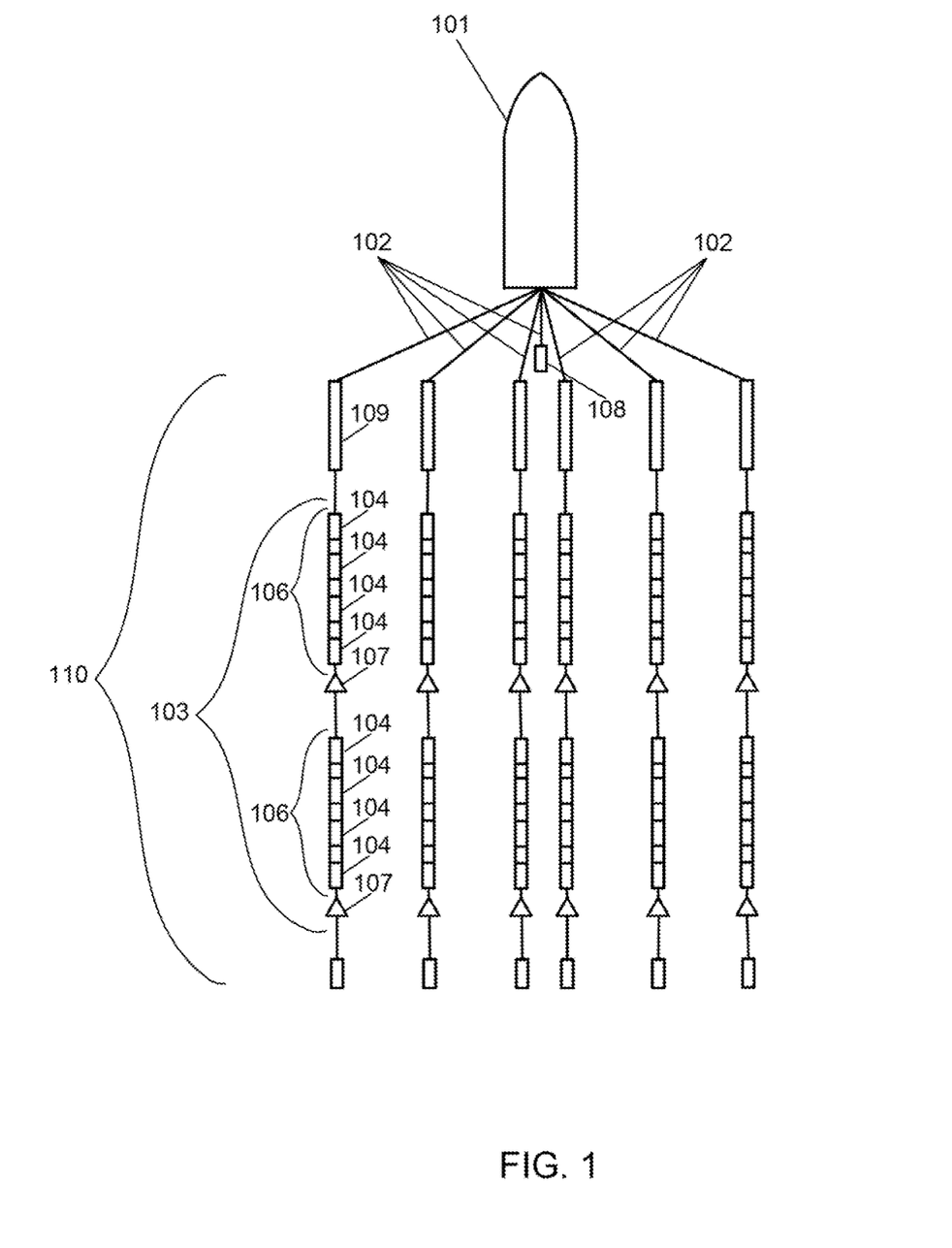
FIG. 1 depicts an exemplary marine-seismic cable system in use.

FIG. 1 depicts an exemplary marine-seismic cable system in use. A marine vessel 101, including a lead-in towing assembly 102, may deploy and tow electro-mechanical cables 103, on or below the surface of the water. The electro-mechanical cables 103 may be of any suitable length and may be made up of shorter connected sections 106 of electro-mechanical cabling which may also be of any suitable length. For example, an electro-mechanical cable 103 may be kilometers in length, with each section 106 being, for example, 75 meters to 200 meters in length. The sections 106 may be detachable from each other. The electro-mechanical cable 103 may be, for example, a marine-seismic cable or seismic streamer. Seismic-imaging systems may make use of more than one electro-mechanical cable 103. The electro-mechanical cables 103 may be deployed as a single section 106, a linear series of sections 106, or as a horizontal offset series of sections 106, producing a sensor field.

Sections 106 of the electro-mechanical cables 103 may include various sensor components 104. The sensor components 104 may be, for example, hydrophones, geophones, accelerometers, electro-magnetic sensors, optical sensors, gravity sensors, or a combination thereof and may be distributed at regular intervals along the electro-mechanical cables 103. An outer jacket around the electro-mechanical cable 103 may be, for example, a polyurethane jacket, and may be smooth in order minimize noise in the sensor components 104. A buoyant material may be contained in the electro-mechanical cable 103, and may help keep the electro-mechanical cable 103 level on top of or under the water.

A seismic source 108 may be used to produce a shockwave, using any suitable manner of generating acoustic energy. The seismic source may include one or more air guns or vibratory elements. When conducting an acoustic survey, the shockwave may be reflected by the geologic features of the sea floor and picked up by the sensor components 104. Vibrations emanating from the head of the streamer field (or streamer spread) 110, near the marine vessel 101, may contaminate the seismic signals measured by the sensor components 104. Radial vibration isolation modules 109 may be placed between the towing assembly 102 and the electro-mechanical cables 103, at the head of the streamer field 110, in order to mitigate the transmission of vibration noise.

The electro-mechanical cables 103 may each include one or more positioning devices, also known as birds 107. Birds 107 may include control surfaces that may be used to position the electro-mechanical cables 103. For example, the birds 107 may be used to maintain the electro-mechanical cables 103, to which they are attached, in a known and controllable position relative to other electro-mechanical cables 103. The birds 107 are capable of moving the electro-mechanical cables 103. The electro-mechanical cables may also include attached recovery nodes, which may be devices clamped to the outsides of the electro-mechanical cables 103 that may include sensors (pressure sensors) that monitor for when the electro-mechanical cables 103 pass a given depth. The recovery nodes may include an inflatable portion that may inflate if an electro-mechanical cable 103 has sunk too far into the water, causing the electro-mechanical cable 103 to float back to the surface where it can be retrieved.

Because the electro-mechanical cables 103 are deployed in a viscous fluid, for example, water, the electro-mechanical cables 103 are subject to energy sources from both man-made sources, such as energy transmitted through the tow assembly 102, or energy from the propulsion system of the marine vessel 101, and natural sources, such as wave motion and weather. The energy from these sources may diminish the quality of the seismic data recorded by the sensor components 104, as they may interfere with the signal from the acoustic energy reflected off the sea floor. Thus, the signal measured by the sensor components 104 of an electro-mechanical cable 103 may be divided into two parts, the "signal" pertaining to the geophysical structure of the sea floor, and "noise," which may be picked up from other man-made or natural sources. The signal is desired while the noise contaminates the signal.

Existing noise suppression hardware, such as the radial vibration isolation modules 109, which are concentrated at the head of the streamer field 110, between the towing assembly 102 and the electro-mechanical cables 103, do not provide sufficient levels of noise abatement. Thus, there is a need for an apparatus and method for cable dynamics suppression that removes more noise than the existing devices.

SUMMARY

In various embodiments, an apparatus and method are provided for cable dynamics suppression via non-linear flexures. The apparatus for cable dynamics suppression includes at least one section for suppression of motion, wherein the at least one section includes an axial motion suppression section; and the axial motion suppression section comprising equipment for the attenuation of axial vibrations in an electro-mechanical cable. The equipment is configured to produce a digressive stiffness curve.

In another embodiment, there is a method for preparing a cable dynamics isolator, the method including determining forces experienced by an electro-mechanical cable; determining a tension band for vibrations in the electro-mechanical cable caused by the forces experienced by electro-mechanical cable; selecting at least one of: one or more springs based on the determined tension bands, and one or more flexures based on the determined forces; and installing any of the selected one or more springs and one or more flexures within a housing to form a vibration mitigation assembly.

In still another embodiment, there is an apparatus for cable dynamics suppression that includes a male coupling adapted to couple to a first component of an electro-mechanical cable; a female coupling adapted to couple to a second component of an electro-mechanical cable; an axial motion suppression section disposed in between the male coupling and the female coupling and comprising at least one spring arranged on a rod and adapted to attenuate axial vibrations in the electro-mechanical cable, wherein the rod is mechanically linked to either the male coupling or the female coupling and is adapted to compress the at least one disk spring when the male coupling and the female coupling are pulled away from each other; and a bending and rotational motion suppression section disposed between the male coupling and the female coupling and comprising at least one axis flexure and adapted to attenuate rotational and transverse vibrations in the electro-mechanical cable.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. In various embodiments as illustrated in FIGS. 2-9, a cable dynamics isolator is included in an electro-mechanical cable for cable dynamics suppression via non-linear single and/or multi-axis flexures.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As discussed above, existing noise suppression hardware, such as the radial vibration isolation modules 109, are concentrated at the head of the streamer field 110, between the towing assembly 102 and the electro-mechanical cables 103. This placement may be based on an assumption that the primary source of cable borne vibration precedes the head of the streamer field 110, and that transverse and axial motion within the electro-mechanical cables 103 derives from axial motion of the electro-mechanical cables 103. However, it was observed that noise generated in front of the head of the streamer field 110 may decay rapidly, and noise picked up by the sensor components 104 of the electro-mechanical cables 103 may originate with the birds 107, as well as with the recovery nodes or other existing nodes that are attached to the electro-mechanical cables 103. It has also been observed that the birds 107, the recovery nodes or other nodes may introduce noise along all axes of movement of the electro-mechanical cables 103, including the x, y, z, and rotational axes. Thus, a new device is necessary for removing the noise and also the position of the new or existing devices needs to be adapted to the characteristics of the streamer.

Figure 2:
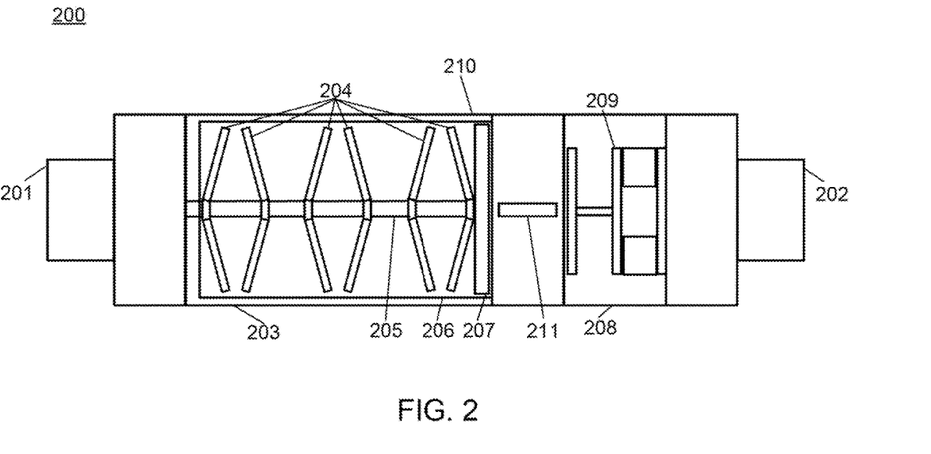
FIG. 2 depicts an exemplary cable dynamics isolator.

In this regard, FIG. 2 depicts a cable dynamics isolator 200. Cable dynamics isolator 200 may include male and female couplings 201 and 202, and a housing 210 that may contain an axial motion suppression section 203 and/or a bending and rotational motion suppression section 208. The male and female couplings 201 and 202 may allow the cable dynamics isolator 200 to be coupled to any of the components of an electro-mechanical cable 103, such as the sections 106 with sensor components 104 and the birds 107. For example, the cable dynamics isolator 200 may be coupled to one of the birds 107 and to one of the sections 106 along the length of one of the electro-mechanical cables 103 using the male and female couplings 201 and 202. Alternatively, the cable dynamics isolator 200 may be coupled between two consecutive sections 106. In one application, the cable dynamics isolator 200 may be coupled between a section 106 and the towing assembly 102 in FIG. 1. In still another application, two or more cable dynamics isolator 200 are connected to each other before being connected to the sections. In yet another application, the cable dynamics isolator 200 may be built into one or more sections 106 of the streamer, or into a radial vibration isolation module 109.

Housing 210 may be any suitable housing, of any suitable material and any suitable shape for marine use. For example, housing 210 may be a cylindrical polyurethane jacket. Housing 210 may cover the axial motion suppression section 203 and the bending and rotational motion suppression section 208. Housing 210 may be flexible and stretchable, allowing for some motion of the components of the cable dynamics isolator 200.

The axial motion suppression section 203 may include any suitable equipment for the suppression of axial motion in the cable dynamics isolator 200. For example, the axial motion suppression section 203 may include disk springs 204, arranged along a rod 205, having a plunger 207, inside of a chamber 206. Note that rod 205 does not seal chamber 206 and does not have to have an exterior diameter that matches an interior diameter of chamber 206. In other words, the exterior diameter of plunger 207 may be substantially less than the interior diameter of chamber 206. The rod 205 may be attached, or mechanically linked, to the male coupling 201 or the female coupling 202, for example, by being welded or bolted to the male coupling 201 or the female coupling 202, such that motion of the male coupling 201 or the female coupling 202 may be transmitted to the rod 205. Chamber 206 may be attached, or mechanically linked, to the male coupling 201 or the female coupling 202, whichever is not attached to the rod 205, such that motion of the male coupling 201 or the female coupling 202 may be transmitted to chamber 206. The rod 205 and the chamber 206 may be directly attached to the male coupling 201 and the female coupling 202, or may be indirectly linked to the male coupling 201 and the female coupling 202, for example, by being attached to a part of the cable dynamics isolator 200 that is in turn attached to the male coupling 201 and the female coupling. The rod 205 may be inserted into the chamber 206, with the shaft of the rod 205 going through an appropriately sized opening in the base of the chamber 206. The rod 205 and the chamber 206 may be made from any suitable material, and may be in any suitable shape for use within the housing 210 of the cable dynamics isolator 200. For example, the rod 205 and the chamber 206 may be cylindrical The disk springs 204 may be of any suitable size and made of any suitable material, including metals and composites, and may have a deflection curve that is non-linear and digressive as discussed later with regard to FIG. 7a. Any number of disk springs 204 may be arranged along the rod 205 in any suitable manner, for example, in a parallel, in series, or any combination thereof. For example, the number and arrangement of disk springs 204 used in the cable dynamics isolator 200 may depend on the nature, length, diameter, etc. of the electro-mechanical cable 103 to which the cable dynamics isolator 200 may be attached, and the location of attachment. In other words, the cable dynamics isolator 200 has a "tuning" capability that may be exploited by the seismic survey's operator to achieve the best damping/attenuation of the noise propagating along the streamer.

The rod 205 and the chamber 206 may be arranged such that motion of the male and female coupling 201 and 202 away from each other may cause compression of the disk springs 204. For example, the cable dynamic isolator 200 may experience tension which may pull the female coupling 202 away from the male coupling 201. The chamber 206, attached to the female coupling 202, may also move away from the male coupling 201. This may result in the base of the chamber 206 compressing the disk springs 204, starting with the disk springs 204 nearest the male coupling 201. When the male coupling 201 moves away from the female coupling 202, the rod 205 may move with the male coupling 201, which may cause the plunger 207 to compress the disk springs 204 starting with the disk springs 204 closest to the female coupling 202. The disk springs 204, rod 205, and chamber 206 may have an ultra-low spring rate (as discussed later), while still being able to support high tensions such as those found within an electro-mechanical cable 103. The action of the disk springs 204, rod 205, and chamber 206, may serve to suppress the transmission of axial motion through the cable dynamic isolator 200, for example, attenuating axial vibrations transmitted through the electro-mechanical cable 103 due to tension induced by the towing of the electro-mechanical cable 103 and drag of the electro-mechanical cable 103. This may reduce the noise experienced by the sensor components 104. Any other suitable spring shape may also be used in place of the disk springs 204.

The axial motion suppression section 203 may also use dampers to inhibit free vibration along longitudinal axis. The flow path between Belleville sets may be controlled and filled with the appropriate fluid. Select friction materials may be included at sliding points to implement coulomb damping.

The bending and rotational motion suppression section 208 may include any suitable equipment for the suppression of rotational motion and bending in the cable dynamics isolator 200. For example, the bending and rotational motion suppression section 208 may include a multi-axis flexure 209. The multi-axis flexure 209 may be a 3-axis flexure with low bending stiffness in one direction, a higher bending stiffness in the other two directions, and may support large axial tensile loads. Two or more flexure sets, oriented at a minimum of 90 degrees to each other, may be used in the multi-axis flexure 209. This may allow the multi-axis flexure to suppress bending, or transverse motion, regardless of orientation of the cable dynamics isolator 200. The multi-axis flexure 209 may also attenuate rotational motion. The multi-axis flexure 209 may be made of any suitable material. The action of the multi-axis flexure 209 may suppress transmission of bending and rotational motion through the cable dynamic isolator 200, for example, attenuating vibrations from bending and rotational motion transmitted from one of the birds 107, reducing the noise experienced by the sensor components 104. The bending and rotational motion suppression section 208 may also use friction pads for coulomb damping and fluid filled bladders or pockets may provide viscous damping.

The cable dynamics isolator 200 may also include sensors 211. The sensors 211 may be any suitable sensors or instrumentation for monitoring the performance of the cable dynamics isolator 200. For example, the cable dynamics isolator 200 may include, within the housing 210, any combination of sensors 211 that may be, for example, accelerometers to measure acceleration, force sensors for the measurement of force, and strain gages for the measurement of strain within the cable dynamics isolator 200.

Figure 3:
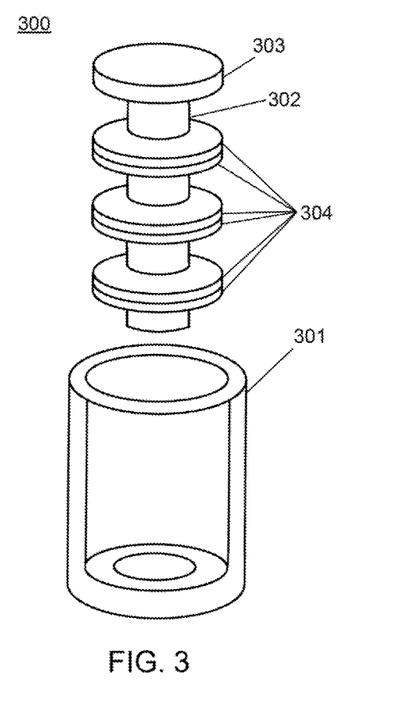
FIG. 3 depicts an exemplary portion of a cable dynamics isolator including a chamber, a rod, and disk springs.

FIG. 3 depicts an exemplary portion of a cable dynamics isolator including a chamber, a rod, and disk springs. The portion of the cable dynamics isolator 300 used in the axial motion suppression section 203 may include chamber 301, rod 302 with plunger 303, and disk springs 304. The disk springs 304 may be arranged in any suitable manner along the rod 302. For example, several pairs of the disk springs 304 may be arranged along the rod 302, with each pair including two disk springs 304 in series, touching at their base. The rod 302 may be inserted into the chamber 301, such that the disk springs 304 may be compressed between the bottom of the chamber 301 and the plunger 303 based on motion of either the chamber 301 or the rod 302.

Figure 4:
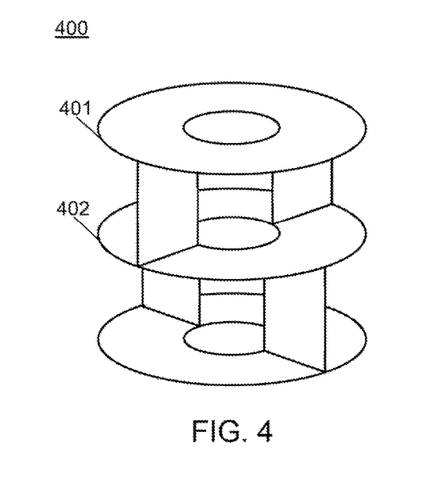
FIG. 4 depicts an exemplary multi-axis flexure.

FIG. 4 depicts an exemplary multi-axis flexure. Note that a single axis flexure may be used. A multi-axis flexure 400 may be, for example, a beam-type flexure, and may include flexure sets 401 and 402. The flexure sets 401 and 402 may be oriented at a minimum of a 90 degree angle with respect to each other, and may in combination absorb rotational motion and bending. The multi-axis flexure 400 may include any number of flexure sets oriented similarly to the flexure sets 401 and 402.

Figure 5A:
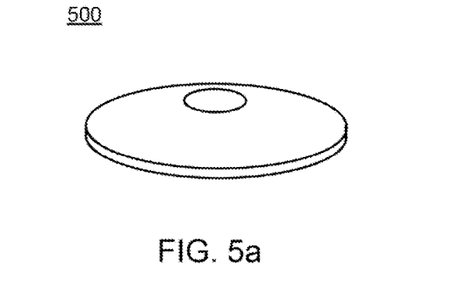
FIG. 5a depicts an exemplary disk spring.

FIG. 5a depicts an exemplary disk spring. A disk spring 500 for use with the cable dynamics isolator 200 may be in any suitable shape, and may be made of any suitable material. For example, the disk spring 500 may include an opening of any suitable size at a narrow end, and any suitable circumference around the based at a wider end. The disk spring 500 may be bowl-shaped, such that the disk spring 500 maintains a near-uniform thickness between the wider end and the narrower end. When two disk springs 500 are arranged in series, with the wider ends touching, contact may be made at the end of the wider end. When the disk spring 500 is compressed, either from the wider end or the narrower end, the disk spring 500 may flatten, bringing the opening of the narrower end toward the wider end and causing the disk spring 500 to become more plate shaped as the disk spring 500 compresses.

Figure 5B:
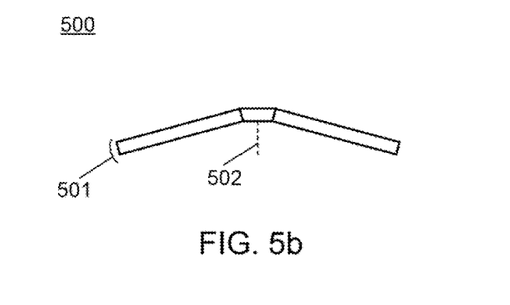
FIG. 5b depicts an exemplary cross-sectional view of a disk spring.

FIG. 5b depicts an exemplary cross-sectional view of a disk spring. The disk spring 500 may have a thickness 501 and a height 502. The height 502 may be the distance the bottom of the narrow end of the disk spring 500 travels while being compressed before the disk spring 500 is flat. The thickness 501 may be the uniform or near-uniform thickness of the disk spring 500 from the wider end to the narrower end. The thickness 501 and the height 502 of the disk spring 500 may determine the shape of the deflection curve for the disk spring 500, which may indicate how the disk spring 500 attenuates axial motion. The greater the ratio between the height 502 and the thickness 501, the more digressive the load versus elongation curve for the disk spring 500 may be. The slope of the deflection curve for the disk spring 500 is the spring rate for the disk spring 500. A higher ratio between the height 502 and the thickness 501 of the disk spring 500 may also result in wider low-spring rate zone for the disk spring 500. Note that a linear range for the load versus elongation curve is considered in the field when the height to thickness ratio is less than 0.6. In one application, the height to thickness ratio for the multi-axis flexure 400 is in the range of 1.2 to 1.4. In another application, the height to thickness ratio for the multi-axis flexure 400 is selected such that the load versus elongation curve is non-linear, i.e., the ratio is larger than 0.6.

Figure 6:
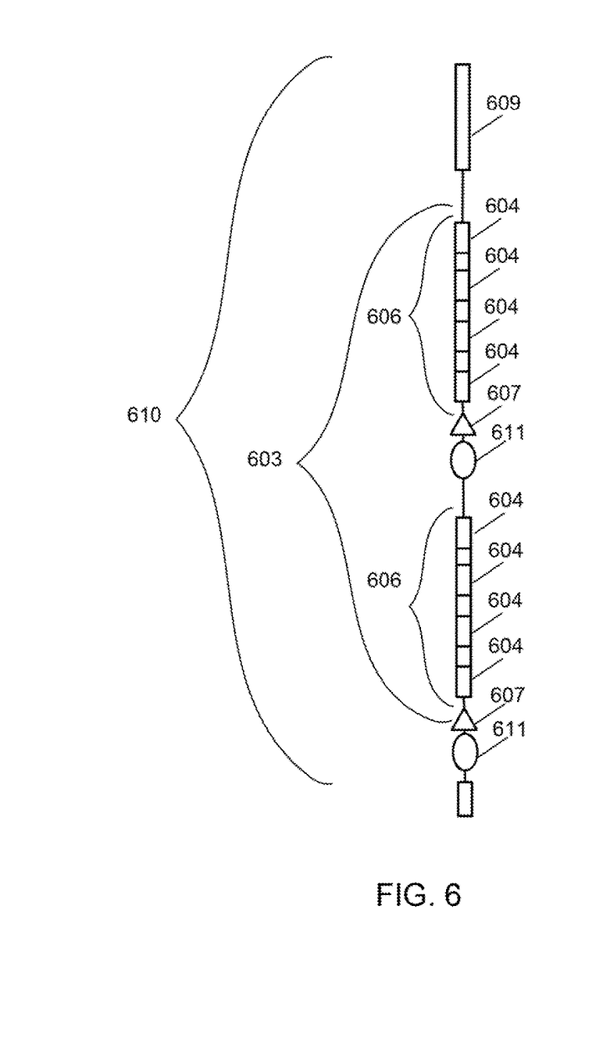
FIG. 6 depicts an exemplary electro-mechanical cable with cable dynamics isolators.

FIG. 6 depicts an exemplary electro-mechanical cable with cable dynamics isolators. Cable dynamics isolators 611 may be deployed at any suitable location within streamer field 610. For example, the cable dynamics isolators 611 may be deployed immediately behind the birds 607 along the electro-mechanical cable 603. The birds 607 may allow for the maintenance of uniform separation between the electro-mechanical cables 603 in the streamer field 610, but may also introduce forces that act perpendicular to the electro-mechanical cable 103, inducing localized transverse motion in the electro-mechanical cable 103. The cable dynamics isolators 611 may attenuate this transverse motion, for example, through the use of the bending and rotational motion suppression section 208, including, for example, the multi-axis flexure 209. This may reduce the amount of noise induced by the actions of the birds 607 that reaches the sensor components 604 in each section 606 of the electro-mechanical cable 603.

The cable dynamics isolators 611 may also attenuate noise from axial motion induced in the electro-mechanical cable 603. The electro-mechanical cable 603 may be towed by a marine vessel, such as the marine vessel 101. Tension may be introduced into the electro-mechanical cable 603 by the towing, inducing axial motion in the electro-mechanical cable 603. The cable dynamics isolators 611 may attenuate the noise from the axial motion of the electro-mechanical cable 603, for example, with the axial motion suppression section 203, which may include the disk springs 204, the rod 205, and the chamber 206. The tension in the electro-mechanical cable 603 may be a function of drag, which may result in low tension at the tail of the electro-mechanical cable 603 and high tension at the head of the electro-mechanical cable 603. The size and number of disk springs 504 used in a given cable dynamics isolator 611 may be calculated so that the disk springs may collapse as needed to ensure a low spring rate for the tension present in the electro-mechanical cable 603 at the specific location of the isolator 611. Thus, regardless of the location at which the cable dynamics isolators 611 are deployed within the electro-mechanical cable 603, they can exhibit low spring rate for the tension at that location, and high spring rates for smaller or higher tensions as will be discussed later. This may reduce the axial noise that reaches the sensor components 604 in each of the sections 606 of the electro-mechanical cable 603.

Figure 7A:
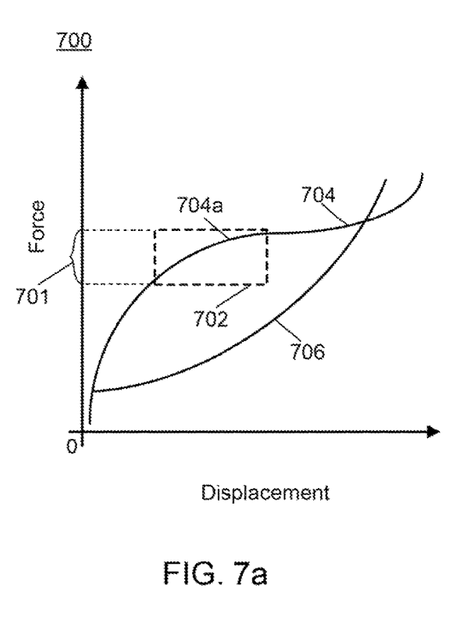
FIGS. 7a and 7b depict exemplary graphs representing the dynamics of a cable dynamics isolator.
Figure 7B:
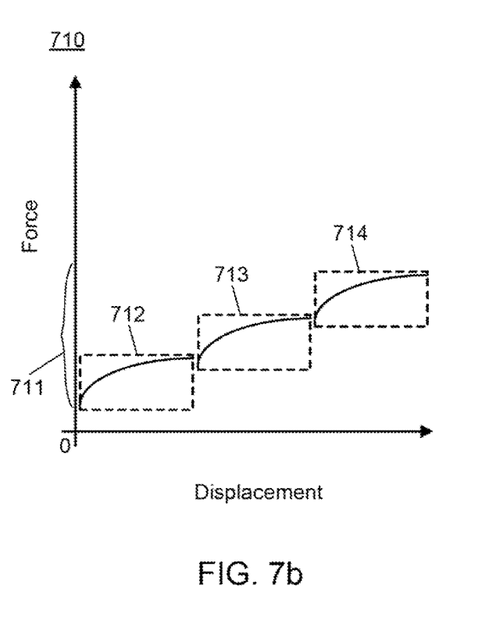

FIGS. 7*a* and 7*b* depict exemplary graphs representing the dynamics of a cable dynamics isolator. Graph 700 may represent an exemplary deflection curve of a non-linear spring, such as a disk spring with a height to thickness ratio greater than 0.6. Graph 700 defines a deflection curve 704 that is non-linear and digressive, i.e., it provides digressive stiffness. Note that traditional noise suppressing devices have a curve 706 that provides progressive stiffness. Such a characteristic increases in a non-linear manner as illustrated in FIG. 7*a*. Note that curve 706 has no linear portion while digressive curve 704 exhibits a substantially linear portion 704*a* having a low spring rate. The disk springs 204 may be stiff above and below tension values inside of a range 701, and soft when experiencing tension values within the range 701, i.e., for portion 704*a*. For example, the range 701 may between 16,000 and 20,000 Newtons (or 25,000 and 29,000 N), indicating that the disk springs 204 may be stiff when subject to less than 16,000, or more than 20,000 N, and may be soft when subject to between 16,000 and 20,000 N. Other values for this range may be used depending on the characteristics of the streamer spread, vessel's speed, etc. The range 701 may be the operational region for the disk springs 204, and may indicate the size of a low spring rate zone 702 for the disk springs 204. Thus, when cable dynamics isolator 611 is placed in the electro-mechanical cable at a location that corresponds to the force range 701, it exhibits a low spring rate, which attenuates axial noise propagation. Note that the desired operational range for disk springs 204 is substantially linear in the low spring rate zone 702.

Graph 710 represents an exemplary piecewise continuous deflection curve for a series of disk springs, such as the disk springs 204. For example, the cable dynamics isolator 200 may use multiple sets of disk springs 204 in any suitable parallel and series combinations, where each set of disk springs 204 may be arranged in series. The disk springs 204 may differ, for example, having different thicknesses and heights. For example, two disk springs 204 in a first pair may have the same thickness and height as each other, while having a different thickness and height from two disk springs 204 in a second pair. The piecewise deflection curve may result when disk springs 204 are selected and arranged to optimize for tension bands. For example, the graph 710 shows a piecewise deflection curve for disk springs 204 optimized for a tension band 711. Three sets of disk springs 204 may be used, with each having a low spring rate zone covering a different part of the tension band 711. The low spring rate zone 712 may belong to a first set of disk springs 204, the low spring rate zone 713 may belong to a second set of disk springs 204, and the low spring rate zone 714 may belong to a third set of disk springs 204. By using all three sets of disk springs 204, the cable dynamics isolator 200 may have a low spring rate across the entire tension band 711, allowing the cable dynamics isolator 200 to attenuate axial noise from any tension level in the entire tension band 711.

Figure 8:
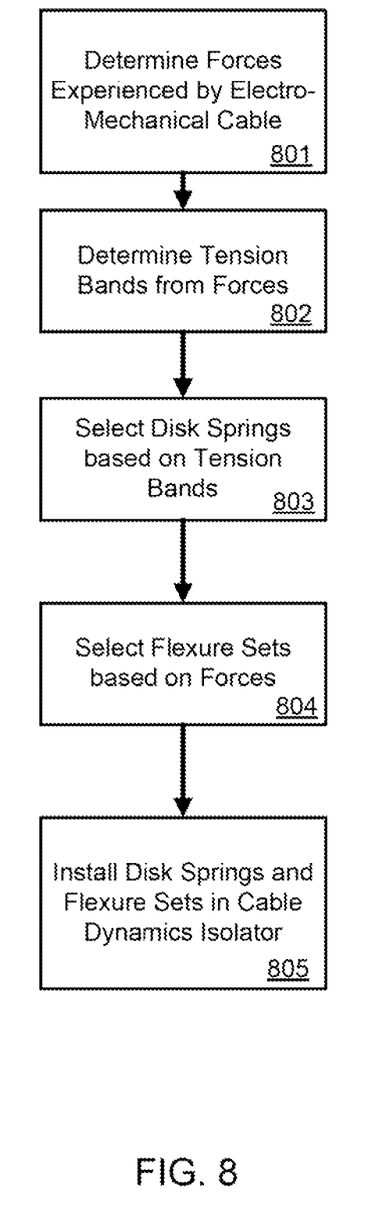
FIG. 8 depicts an exemplary procedure for preparing a cable dynamics isolator.

FIG. 8 depicts an exemplary procedure for preparing a cable dynamics isolator. In block 801, forces experienced by an electro-mechanical cable may be determined at various locations. For example, the electro-mechanical cable 103 may be tested at sea, while being towed behind the marine vessel 101. Vector sensors, such as accelerometers, may be used in the electro-mechanical cable 103 to determine the properties of axial, rotational, transverse, and bending forces experienced at various points along the electro-mechanical cable 103. The forces may also be determined in an any other suitable manner, including simulations, estimations, or application of engineering and physics principles to the known properties of the electro-mechanical cable 103, marine vessel 101, towing assembly 102, and the water.

In block 802, tensions bands may be determined from the forces. For example, a tension band such as the tension band 711 may be determined for the electro-mechanical cable 103. The properties of the axial forces determined for the electro-mechanical cable may be used to determine any tension band, such as the tension band 711, for which a low spring rate may be needed in the cable dynamics isolator 200 in order to attenuate axial vibration. For example, it may be determined that attenuating axial vibration in the electro-mechanical cable may require a low spring rate in the axial motion suppression section 203 in a tension band from 5000 to 10000 Newtons.

In block 803, disk springs may be selected based on tension bands. For example, the disk springs 204 may be selected and arranged based on the tension bands that require a low spring rate in order to attenuate axial vibration of the electro-mechanical cable 103. Any number of the disk springs 204 may be selected based on height and thickness, and may be arranged in any suitable manner so that, for example, a piecewise continuous deflection curve for the disk springs 204 may include low spring rate zone covering the desired tension bands.

In block 804, flexure sets may be selected based on the forces. For example, the bending, transverse, and rotational forces may be used to select flexure sets, such as the flexure sets 401 and 402, for inclusion in the cable dynamics isolator 200. The selected flexure sets may be used in a multi-axis flexure, such as the multi-axis flexure 209.

In block 805, the selected disk springs and flexure sets may be installed in a cable dynamics isolator. For example, the disk springs 204, along with the rod 205 and chamber 206, and multi-axis flexure 209, may be installed in the cable dynamics isolator 200, in the axial motion suppression section 203 and the bending and rotational motional suppression section 208.

The cable dynamics isolator 200 may include only the axial motion suppression section 203, or only the bending and rotational motion suppression section 208, depending on the intended use of the cable dynamics isolator 200. For example, if there are no tension bands for which a low spring rate is needed, the cable dynamics isolator may not need any of the disk springs 204, so none may be selected, and only the bending and rotational motional suppression section 208 may be included, including, for example, the multi-axis flexure 209. The cable dynamics isolator 200 may be attached to the electro-mechanical cable 103 at any suitable point along the electro-mechanical cable 103, including within one of the sections 106. If the cable dynamics isolator 200 is installed within one of the sections 106, the cable dynamics isolator 200 may omit the male and female couplings 201 and 202.

Thus, according to an embodiment, a cable dynamics isolator may be adjusted to have more or less disk springs and more or less multi-axis flexures depending on the type of streamer, the forces exerted on the streamer, and the location of the cable dynamics isolator along the streamer. In other words, a cable dynamics isolator may be dynamically configured for a future job in a streamer. This provides great flexibility in fitting any existing streamer with the appropriate noise suppression device, at any desired location along the streamer.

Figure 9:
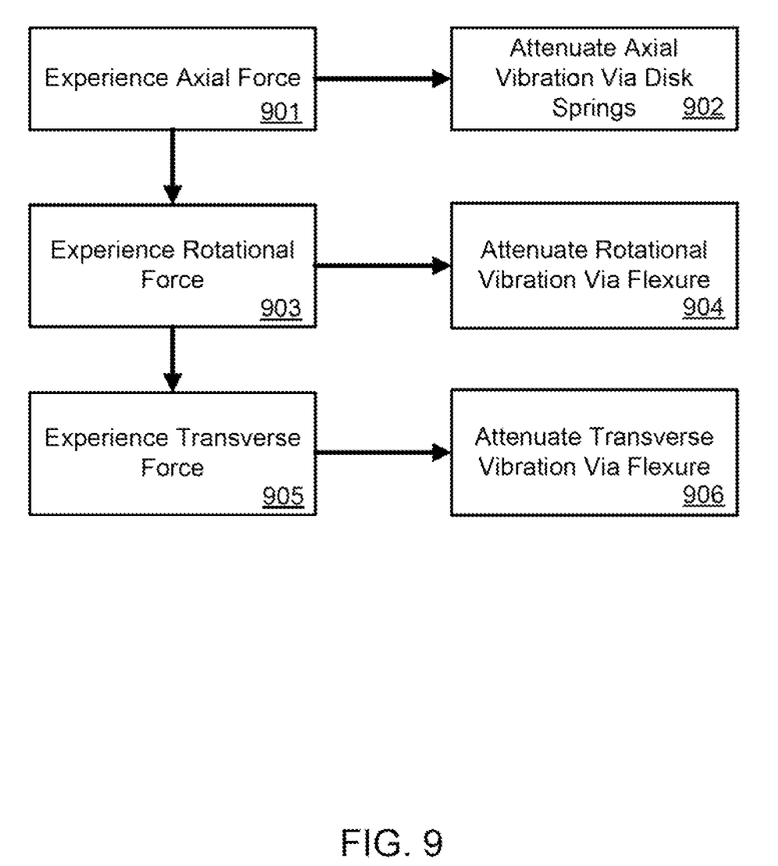
FIG. 9 depicts an exemplary procedure for a cable dynamics isolator.

FIG. 9 depicts an exemplary procedure for a cable dynamics isolator. In block 901, a cable dynamics isolator may experience axial force. For example, the cable dynamic isolators 611 on the electro-mechanical cable 603 may experience axial force due to towing of the electro-mechanical cable 603. As the electro-mechanical cable 603 is towed forward, the part of the electro-mechanical cable 603 in front of the cable dynamics isolators 611 may pull on the male coupling 201, pulling it away from the female coupling 202, as the portion of the electro-mechanical cable behind the cable dynamics isolators 611 may cause drag. The axial force may be experienced by the electro-mechanical cable 603.

In block 902, axial vibrations may be attenuated via disk springs. For example, axial vibrations may be induced by the tension in the electro-mechanical cable 603 due to towing. As the male coupling 201 is pulled away from the female coupling 202, the plunger 207 may compress the disk springs 204 in the cable dynamics isolators 611. The disk springs 204 may thus attenuate the axial vibrations induced by the axial force. When vibrations that propagate along the electro-mechanical cable are attenuated, the disk springs 204 may uncompress in a manner that reduces any axial vibrations induced by the vibrations on the electro-mechanical cable 103. This may reduce the noise experienced by the sensor components 604.

In block 903, a cable dynamics isolator may experience rotational force. For example, the cable dynamic isolators 611 on the electro-mechanical cable 603 may experience rotational force due to towing of the electro-mechanical cable 603 through the water, due to the motion of the water, or due to the actions of the birds 607. The rotational force may be experienced down the length of the electro-mechanical cable 603 from the origin of the force, for example, one of the birds 607.

In block 904, rotational vibrations may be attenuated via flexures. For example, the multi-axis flexure 209 in the cable dynamics isolators 611 may absorb rotation, attenuating vibrations caused by any rotational forces experienced by the electro-mechanical cable 603. This may reduce the noise experienced by the sensor components 604.

In block 905, a cable dynamics isolator may experience transverse force. For example, the cable dynamic isolators 611 on the electro-mechanical cable 603 may experience transverse forces due to towing of the electro-mechanical cable 603 through the water, due to the motion of the water, or due to the actions of the birds 607. The transverse force may be experienced down the length of the electro-mechanical cable 603 from the origin of the force, for example, one of the birds 607.

In block 906, transverse vibrations may be attenuated via flexures. For example, the multi-axis flexure 209 in the cable dynamics isolators 611 may absorb bending motion, attenuating vibrations caused by any transverse forces experienced by the electro-mechanical cable 603. This may reduce the noise experienced by the sensor components 604.

The disclosed exemplary embodiments provide an apparatus and method for cable dynamics suppression via non-linear multi-axis flexures. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus for cable dynamics suppression comprising:
   at least one section for suppression of motion, wherein the at least one section includes,
   an axial motion suppression section; and
   a bending and rotational motion suppression section,
   wherein the axial motion suppression section comprising non-linear equipment for the attenuation of axial vibrations in an electro-mechanical cable,
   wherein the bending and rotational suppression section attenuates transverse and rotational vibrations in the electro-mechanical cable, and
   wherein the non-linear equipment is configured to produce a digressive stiffness curve, which has a linear portion sandwiched between two non-linear portions.

2. The apparatus of claim 1, wherein equipment for the attenuation of axial vibrations comprises:
   one or more springs;
   a rod; and
   a chamber,
   wherein the one or more springs are arranged on the rod within the chamber such that a motion of a plunger towards the base of the chamber compresses the springs between the plunger and the base of the chamber.

3. The apparatus of claim 2, further comprising
   a male coupling; and
   a female coupling, wherein the chamber is disposed in between the male coupling and the female coupling, the rod is mechanically linked to one of the male coupling and the female coupling, the opening of the chamber is mechanically linked to the other of the male coupling and the female coupling, and motion of the male coupling away from the female coupling causes compression of the springs.

4. The apparatus of claim 1, wherein
   the bending and rotational motion suppression section comprises a flexure.

5. The apparatus of claim 4, wherein the flexure is beam-type multi-axis flexure comprising two or more flexure sets, wherein two of the two or more flexure sets are connected to each other at an angle of at least 90 degrees.

6. The apparatus of claim 4, wherein the flexure is an elastomeric multi-axis flexure.

7. The apparatus of claim 1, wherein at least one section for suppression of motion is disposed within a section of the electro-mechanical cable wherein the section further comprises at least one sensor component, or within a radial vibration isolation module of the electro-mechanical cable.

8. The apparatus of claim 2, wherein the one or more springs are disk springs.

9. The apparatus of claim 2, wherein the one or more springs are selected to obtain a first spring rate in a specified tension band based on forces experienced by the electro-mechanical cable, and to obtain a second spring rate, different from the first spring rate, outside the specified tension band.

10. The apparatus of claim 1, wherein the non-linear equipment includes a disk spring that has a height to thickness ratio greater than 0.6.

11. A method for preparing a cable dynamics isolator comprising:
    determining forces experienced by an electro-mechanical cable;
    determining a tension band for vibrations in the electro-mechanical cable caused by the forces experienced by electro-mechanical cable;
    selecting at least one of: one or more springs based on the determined tension bands, and one or more flexures based on the determined forces; and
    installing any of the selected one or more springs and one or more flexures within a housing to form a vibration mitigation assembly,
    wherein the one or more springs is non-linear and produces a digressive stiffness curve, which has a linear portion sandwiched between two non-linear portions.

12. The method of claim 11, wherein at least one of the one or more flexures comprises a beam flexure.

13. The method of claim 11, further comprising arranging the selected one or more springs on a rod.

14. The method of claim 11, further comprising attaching the cable dynamics isolator behind a bird of an electro-mechanical cable.

15. The method of claim 11, wherein at least one of the one or more selected springs is a disk spring.

16. An apparatus for cable dynamics suppression comprising:
    a male coupling adapted to couple to a first component of an electro-mechanical cable;
    a female coupling adapted to couple to a second component of an electro-mechanical cable;
    an axial motion suppression section disposed in between the male coupling and the female coupling and comprising at least one disk spring arranged on a rod and adapted to attenuate axial vibrations in the electro-mechanical cable, wherein the rod is mechanically linked to either the male coupling or the female coupling and is adapted to compress the at least one disk spring when the male coupling and the female coupling are pulled away from each other to produce a digressive stiffness curve, which has a linear portion sandwiched between two non-linear portions; and
    a bending and rotational motion suppression section disposed between the male coupling and the female coupling and comprising at least one axis flexure and adapted to attenuate rotational and transverse vibrations in the electro-mechanical cable.

17. The apparatus of claim 16, wherein one of the first component of the electro-mechanical cable or the second component of the electro-mechanical cable is a bird or an attachment configured to clamp-on to the electro-mechanical cable.

18. The apparatus of claim 16, further comprising two or more disk spring, wherein at least two of the two or more disk spring are arranged in parallel or in series on the rod.

19. The apparatus of claim 16, wherein the axial motion suppression section uses coulomb damping, and wherein the bending and rotational motion suppression section uses coulomb damping or viscous damping.

20. The apparatus of claim 16 further comprising:
at least one sensor, wherein the at least one sensor comprises at least one of an accelerometer, a force sensor, and a strain gauge.

\* \* \* \* \*